Figure 1:
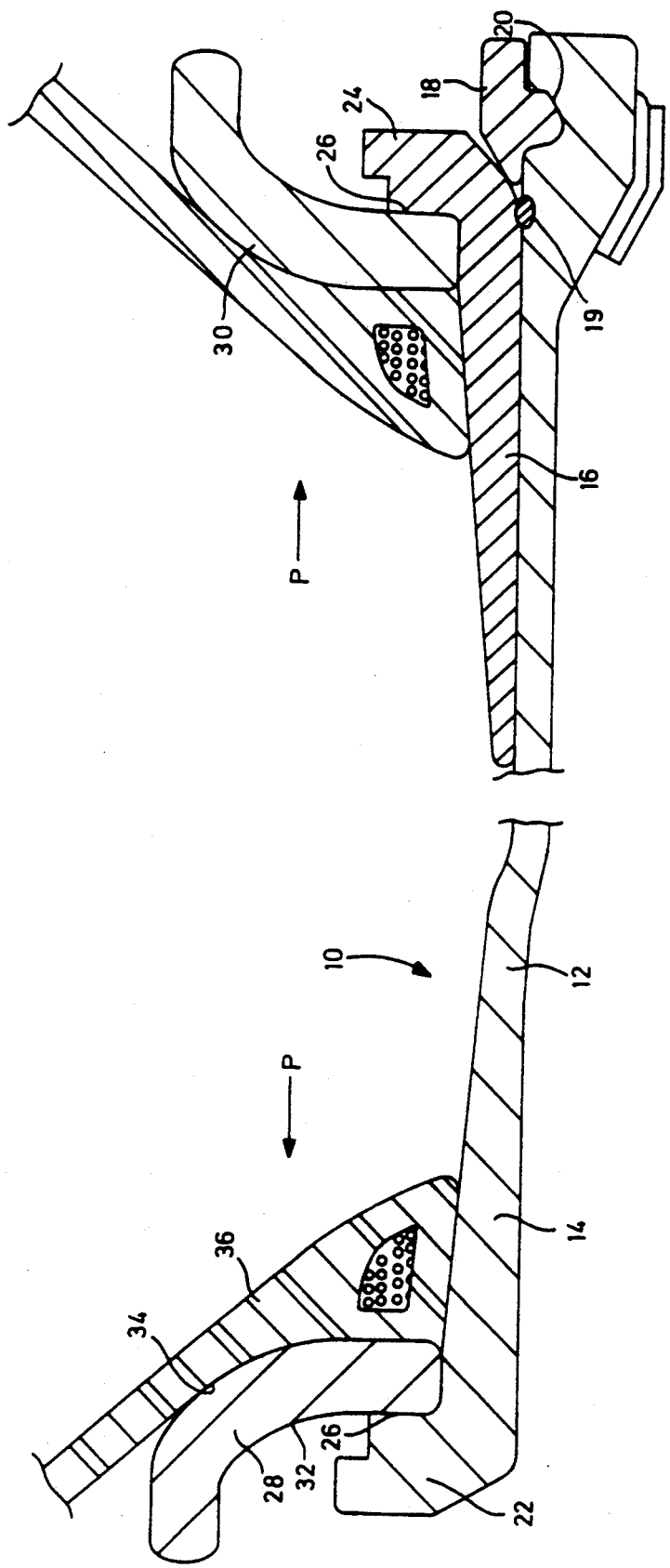

United States Patent [19]

Smith

[11] Patent Number: 5,240,055
[45] Date of Patent: Aug. 31, 1993

[54] OFF-HIGHWAY RIM WITH DISHED FLANGE

[75] Inventor: William T. Smith, Quincy, Ill.

[73] Assignee: Titan Wheel International Inc., Quincy, Ill.

[21] Appl. No.: 834,946

[22] Filed: Feb. 14, 1992

[51] Int. Cl.$^5$ ............................................... B60B 25/08
[52] U.S. Cl. .................................. 152/409; 301/35.3; 152/410
[58] Field of Search ............... 152/409, 410, 396, 402, 152/405, 406; 301/9.1, 35.1, 35.2, 35.3, 95, 30.2

[56] References Cited

U.S. PATENT DOCUMENTS 4,369,826 1/1983 Hendrickson ..................... 152/410

FOREIGN PATENT DOCUMENTS 1150101 4/1985 U.S.S.R. ............................. 152/409

Primary Examiner—Russell D. Stormer
Attorney, Agent, or Firm—Burns, Doane, Swecker & Mathis

[57] ABSTRACT

An off-highway wheel rim has a flange formed with a frustroconical outwardly directed band at its radially inner surface. The band abuts an inwardly directed surface on an upturned edge of the rim so that in the free body state the opposed surfaces diverge. Upon inflation of the tire, the faces are brought into engagement by the pressure forces within the tire to produce face-to-face contact between flange and rim.

10 Claims, 3 Drawing Sheets

OFF-HIGHWAY RIM WITH DISHED FLANGE

The present invention relates to wheels and in particular wheels suitable for use with off-highway vehicles.

Off-highway vehicles utilize large diameter wheels which requires the wheel rim to be fabricated from several pieces. This assembly method facilitates not only manufacture of the rim but also the mounting of the tire on the rim. Conventionally, such wheel rims have a rim base, a bead seat band, a pair of side flanges, one at each edge of the rim base, an O-ring and a locking ring. One edge of the rim base is upturned to provide a radial edge against which the side flange can abut. This provides a smoothly curved wall against which the bead seat portion of the tire can fit.

The bead seat band slides over the opposite edge of the rim base and also has a radial wall to locate the other side flange. The locking ring acts between the bead seat band and the rim base to locate the band axially. In this way the tire may be slid axially on to the rim base with one flange in place and the other flange and the band subsequently assembled and locked in place prior to inflation.

The inflation pressures for off-highway tires are typically in the order of 100 psi-120 psi. The annular side flanges are subject to axial loads due to these inflation pressures as well as cyclic loading as the tire rolls through its footprint. These forces when combined with the relatively large diameter of the flanges produce significant loads on the upturned edges of the rim base and bead seat band. As a consequence, the flanges tend to rock about the radially outer limit of the upturned edge. This flange movement produces a line contact between the flange and the edge which produces high-stress concentrations at the line contact and also significant bending stresses in the upturned edges.

It is an object of the present invention to provide a wheel rim arrangement in which the above disadvantages are obviated or mitigated.

According to the present invention, there is provided a wheel rim comprising a base, a pair of upturned circumferential support edges at opposite sides of said base, each extending radially outwardly from the base and having an inwardly directed annular surface, an annular flange member associated with each of said edges and projecting radially beyond said support edge, each flange member having an outwardly directed annular surface overlapping said inwardly directed annular surface, said surfaces being divergent in a radial direction whereby axial forces exerted on the support flange by inflation of a tire on said rim moves said annular surfaces into abutment.

By providing the divergent annular surfaces between the flange and the upturned edge, it is found that when the tire is inflated and rotated through its footprint, the flange and rim are deformed to bring the surfaces into planar contact. Typically the divergence is in the range of $\frac{1}{2}°-2\frac{1}{2}°$ and preferably in the order of $\frac{3}{4}°$. With this arrangement, it is found that a face-to-face contact is made rather than a line contact so that the localized stresses are reduced. Moreover, the bending moment induced in the edges of the rim is also reduced, thereby improving the life of the components.

Figure 2:
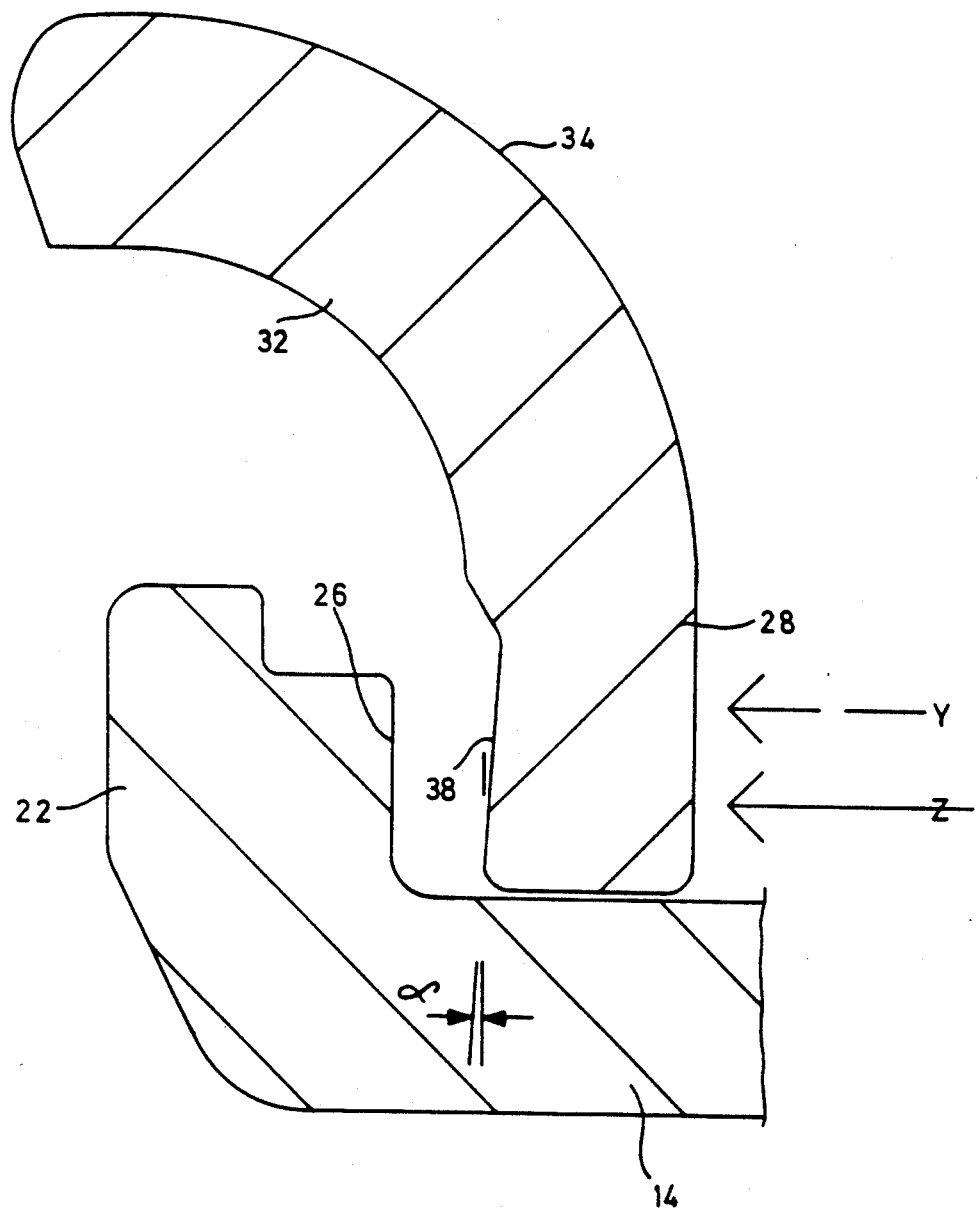
Figure 3:
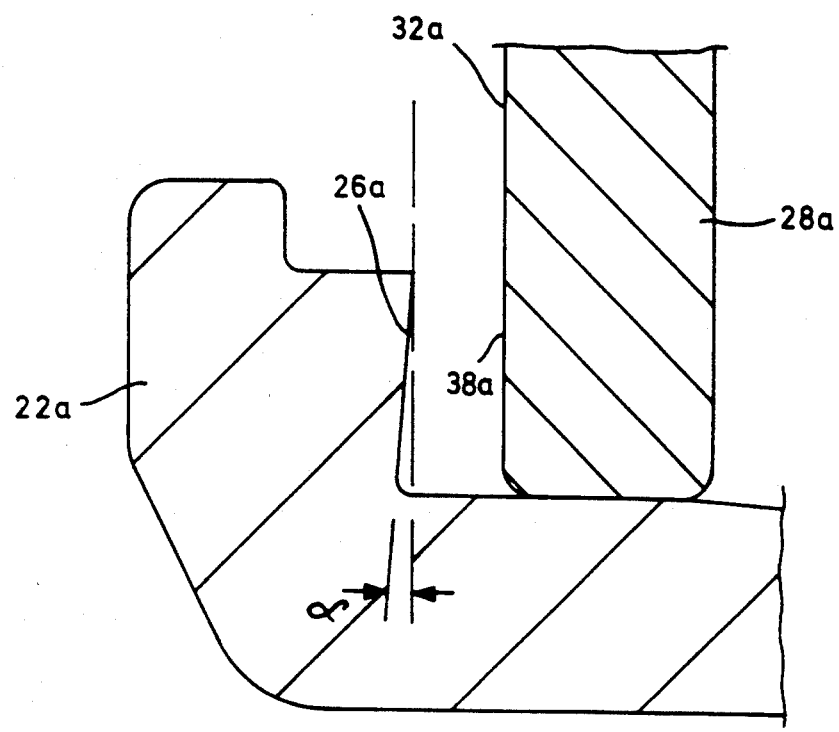

Embodiments of the invention will now be described by way of example only and with reference to the accompanying drawings, in which FIG. 1 is a section through a wheel rim and tire assembly;

FIG. 2 is an exploded view of a portion of the rim assembly shown in FIG. 1; and FIG. 3 is an alternative embodiment of the rim assembly similar to FIG. 2.

Referring therefore to FIG. 1, a rim 10 includes a rim base indicated generally at 12 having a generally cylindrical portion 14 a removable bead seat band 16 is located at one edge of the cylindrical portion 14 and is formed as a hoop to slide over a cylindrical portion 14. The bead seat band 16 is located by a locking ring 18 that engages a gutter 20 formed in the portion 14 to inhibit axial movement of the bead seat band 16 relative to the cylindrical portion 14. An O-ring 19 is located between the band 16 and cylindrical portion 14 to provide an airtight seal. The above arrangement is of conventional nature and therefore will not be described further.

The edge of the cylindrical portion 14 opposite to the bead seat band 16 is formed with an upturned edge 22. Similarly, the axially outer edge of the bead seat band 16 is formed with an upturned edge 24.

Each of the edges 22,24 has an inwardly directed surface 26, each of which is adapted to receive a respective annular flange 28,30. Each of the flanges 28,30 includes an outwardly directed concave surface 32 and an inwardly directed convex surface 34. The convex surface 34 provides a bead seat for the bead portion 36 of a tire installed on the rim 10.

As can be seen more readily in FIG. 2, the concave surface 32 of each of the flanges 28,30 is formed at its radially inner edge with a frustroconical band 38. Band 38 is located so as to overlap or be juxtaposed with the inwardly directed surface 26 of the edge 22. The surface defining band 38 may be formed either by machining or during the die-forming operation of the hoop to provide an annular surface that departs from a radial plane in the range of between $\frac{1}{2}°$ and $2\frac{1}{2}°$ as indicated by the angle $\alpha$. That is, the cone angle of the surface defining the band 38 is between 179° and 175°. It has been found in practice that the preferred angle will be dependent upon the stiffness of the components used in the specific rim design. For the rim illustrated, a divergence of $\frac{3}{4}°$ from a radial plane is optimal.

The flanges 28,30 are brought into abutment with respective ones of the edges 22,24 as the tire is assembled on the rim. In the free body state the surfaces 26,38 diverge of each flange 28,30 so that a line contact is established at the radially inner limit of the surface 26. Upon inflation of the tire, the internal pressure of the tire produces axial forces as indicated by the arrows P in FIG. 1 which forces the surface 38 into engagement with the surface 26. The flange members 28 and the angle $\alpha$ of the surface 38 is chosen such that with the designed inflation pressure, the flange member is deformed so that the surface 38 is parallel to and in contact with the surface 26. This provides a face-to-face contact and thereby distributes the axial forces P over the annular surface 26.

Because of the uniform distribution of the forces over the surface 26, the moment of those forces on the upturned edge 22 is similarly reduced as the forces are effectively acting through the centre of the face 26 rather than at the radially outer limit as in prior proposals. The cyclic loads imposed on the flange as the tire passes through its footprint are also taken across the entire face to inhibit rocking of the flanges 28,30.

In a typical application, the nominal diameter of the base 12 is 57 inches. An inflation pressure of 100 psi generates axial forces on the order of 1,016,800 lbs. By the previous arrangement, this force was concentrated as shown by ghosted arrow Y in FIG. 2. This gives a movement arm corresponding to the depth of the face 26 in the example given, of 1.131 inches, producing a bending torque of 1,150,001 in-lbs. By contrast, the current arrangement provides a face to face contact which distributes this force over the contact face 26, nearly 156 square inches. The movement arm is also reduced to 0.706 inches, as seen by arrow Z, FIG. 2. This 38% reduction of the movement arm generates a final bending torque of 717,861 in-lbs.

In the arrangement of FIG. 3, in which like components will be identified with like reference numerals with a suffix "a" added for clarity, the inwardly directed surface 26a is undercut during machining to an angle $\alpha$ which is in the range of $\frac{1}{2}°-2\frac{1}{2}°$ and preferably $\frac{3}{4}°$. The concave inner surface 32a of flange 28a is formed with a radial portion 38a so that in the free body state the surfaces 26a and 38a diverge by the angle $\alpha$. Again, with this arrangement the angle $\alpha$ is chosen such that at the normal inflation pressures, the deflection of the edge 28a is such as to bring the faces 26a into contact with the band 38a over substantially the entire extent and distribute the axial forces through the upturned edge 28a.

Obviously, although only the edges 22a are shown in detail in FIGS. 2 and 3, the edges 24a and flange 30a are formed in a similar manner.

We claim:

1. A wheel rim comprising a base, a pair of upturned circumferential support edges at opposite sides of said base, each extending radially outwardly from the base and having an inwardly directed annular surface, an annular flange member associated with each of said edges and projecting radially beyond said support edges, each flange member having an outwardly directed annular surface overlapping said inwardly directed annular surface, said surfaces being divergent in a radial direction whereby axial forces exerted on the support flange by inflation of a tire on said rim moves said annular surfaces into abutment.

2. A wheel rim according to claim 1 wherein said outwardly directed annular surface on said flange is frustroconical.

3. A wheel rim according to claim 1 wherein said inwardly directed annular surface on said support edge is frustroconical.

4. A wheel rim according to claim 2 wherein said surfaces diverge at an angle of between $\frac{1}{2}°-2\frac{1}{2}°$.

5. A wheel rim according to claim 4 in which said included angel is $\frac{3}{4}°$.

6. A wheel rim according to any one of claim 1 wherein said base is formed from a fixed portion and a removable portion, each portion having a support edge associated therewith.

7. An annular flange for use on a wheel rim having an upturned circumferential edge to abut with said flange, said flange having a curved concave outer surface and a curved convex inner surface to define a bead seat for a tire supported on the rim, said concave outer surface further including an annular frustroconical band at its radially inner periphery for abutment with an inwardly directed surface on said edge, said band having an included angle relative to the axis of rotation that is less than the included angle of said inwardly directed surface against which said band is to abut so that upon assembly, said band and said inwardly directed surface of said edge diverge in a radially outer direction.

8. A flange according to claim 7 wherein said frustroconical band has a cone angle of between 175° and 179°.

9. A flange according to claim 8 wherein said cone angle is $178\frac{1}{2}°$.

10. An annular flange according to claim 7, wherein the band includes a radially outer edge that is undercut relative to said concave outer surface.

* * * * *